United States Patent [19]

Peng et al.

[11] Patent Number: 5,660,259
[45] Date of Patent: Aug. 26, 1997

[54] GROOVE STRUCTURE OF WET-TYPE FRICTION ENGAGING ELEMENT

[75] Inventors: Han Zhi Peng; Norio Takakura, both of Hokkaido, Japan

[73] Assignee: Dynax Corporation, Hokkaido, Japan

[21] Appl. No.: 592,142

[22] Filed: Jan. 26, 1996

[30] Foreign Application Priority Data

Aug. 11, 1995 [JP] Japan .................. 7-226078

[51] Int. Cl.$^6$ .................. F16D 13/74; F16D 13/72
[52] U.S. Cl. .................. 192/113.36; 192/70.12; 192/70.14; 192/107 R
[58] Field of Search .................. 192/113.36, 70.14, 192/107 R, 58.42, 70.12, 113.22; 188/264 E

[56] References Cited

U.S. PATENT DOCUMENTS

| 4,287,978 | 9/1981 | Staub .................. 192/113.36 |
| 5,094,331 | 3/1992 | Fujimoto et al. .................. 192/70.12 |

Primary Examiner—Rodney H. Bonck
Attorney, Agent, or Firm—Quarles & Brady

[57] ABSTRACT

A groove structure for a wet-type friction engaging element has an approximately U-shaped cross-sectional form in which both corners of a bottom surface are deeper than an intermediate section.

1 Claim, 6 Drawing Sheets

GROOVE STRUCTURE OF WET-TYPE FRICTION ENGAGING ELEMENT

BACKGROUND OF THE INVENTION

1. Field of the Invention

The present invention relates to a groove structure of a wet-type friction engaging element.

2. Discussion of the Prior Art

Wet-type friction engaging elements have been used for example in an automatic transmission for motor vehicles. As the wet-type friction engaging element of the automatic transmission, there have been used a friction plate, a brake band, etc. in a multiple disk friction engagement device. As shown in FIG. 8, a multiple disk friction engagement device 20 conventionally has a hydraulic-actuated piston 21, a plurality of wet-type friction plates 22 arranged alternately so as to be engaged with each other by a piston 21, and a mating plate 23. The wet-type friction disk 22 has a core plate 24 and friction members 25, 25 fixedly attached on both sides of the core plate 24.

As shown in FIG. 7, in the surface 26 of the friction member 25 which is in contact with the mating plate 23, a plurality of radial grooves are usually formed. The grooves are so formed as to improve the coefficient of dynamic friction during initial engagement (coefficient of dynamic friction of initial engagement is herein designated $\mu i$) of the multiple disk friction engagement device 20 by breaking a film of cooling oil interposed between the friction member surface 26 and the mating plate 23 when the friction member surface 26 is pressed into contact with the mating plate 23.

The cross-sectional shape in the direction of width of a conventional groove 27, shown in FIG. 9, is a circular arc form of a greater depth at the center. In the present invention, the "direction of width" identifies the direction which intersects at right angles with the longitudinal direction of the grooves and is parallel with the surface of the friction member.

A problem with the grooves 27 which are of a circular arc form depressed at the center is that a corner section 28 at the border between the grooves 27 and the friction member surface 26 becomes shallow, so that when the mating plate 23 and the wet-type friction plate 22 are pressed into contact with each other, the oil pressure at the corner section 28 will become higher than that at the central part as shown by the pressure versus distance curve in FIG. 9. The cooling oil is forced by this high oil pressure in between the mating plate 23 and the friction member 25 through the grooves 27, making it hard to break the oil film and accordingly lowering the coefficient of dynamic friction during initial engagement $\mu i$ of the multiple disk friction engagement device 20. This problem arises particularly when the contact pressure between the mating plate 23 and the wet-type friction disk 22 has been set low and when the multiple disk friction engagement device 20 is used at low temperatures.

To obviate the above-described problem, the adoption of grooves 30 having a U-shaped cross-sectional shape in the direction of width as shown in FIG. 10 is considered. The groove 30 is formed deep at both corner sections 32, 32 of the bottom in the direction of width, and the oil pressure is lower at the corner sections 31, 31 (the upper corner sections of the groove) at a boundary between the friction member surface 34 and the grooves 30 than at the corner section 28 of the grooves 27 in FIG. 9. Accordingly, this makes it difficult to force the cooling oil in between the mating plate 23 and the friction member 35 of the wet-type friction plate 33. The oil film, therefore, is broken early, thereby enabling improvement of the coefficient of dynamic friction during initial engagement $\mu i$ of the multiple disk friction engagement device 20.

The groove 30 described above, being formed deep as a whole, presents a problem by increasing the sectional area, which requires a greater compressive force in press working to form, resulting in a higher machining cost of the wet-type friction plate 33. Comparing the cross-sectional area S1 in the direction of width of the groove 27 in FIG. 9 and the cross-sectional area S2 in the direction of width of the groove 30 in FIG. 10, if b1 and b2 are the groove widths and h1 and h2 are the depths of the grooves at center in the direction of width, then $S1 = (2 \cdot b1 \cdot h1/3)$ and $S2 = b2 \cdot h2$. Since b1=b2 and h1=h2, S1<S2. Therefore, the cross-sectional area in the direction of width of the grooves 30 is larger than that of the grooves 27.

The groove 27 can be formed deeper than the groove 30 under the same compressive force of a press as seen from the machining data of a press, which is shown in FIG. 6. That is, a greater compressive force is required to form the groove 30 than the groove 27 when these grooves are of the same depth.

SUMMARY OF THE INVENTION

The present invention has solved the above-described problems by providing a groove structure in which the groove has an approximately U-shaped cross section in the direction of width in the friction member surface of the wet-type friction engaging element, and is formed deeper at both corner sections of the bottom in the direction of width than at the intermediate section in the direction of width.

Since the grooves are formed deeper at both corner sections of the bottom than at the intermediate section in the direction of width, the oil pressure at the corner section at a boundary between the friction member surface and the grooves (at the upper corner section of the grooves) is lower than the oil pressure at the corner section at a boundary between conventional grooves and a friction member surface. Therefore, it becomes hard for the grooves to force the cooling oil in between the wet-type friction engaging element and the mating member, thereby improving the coefficient of dynamic friction during initial engagement $\mu i$ of the wet-type friction engaging element by early breaking of the oil film.

Furthermore, the cross-sectional area of the grooves in the direction of width may be much the same as the cross-sectional area in the direction of width of the conventional grooves or smaller. Therefore, the grooves can be formed with approximately the same compressive force as, or a smaller compressive force than, a conventional one in press working.

It is, therefore, an object of the present invention to provide a groove structure capable of improving the coefficient of dynamic friction during initial engagement $\mu i$ by early breaking of the oil film in the initial engagement of the wet-type friction engaging elements without raising machining cost.

DETAILED DESCRIPTION OF THE PREFERRED EMBODIMENTS

Hereinafter preferred embodiments of the present invention will be explained with reference to FIGS. 1 to 7.

Figure 7:
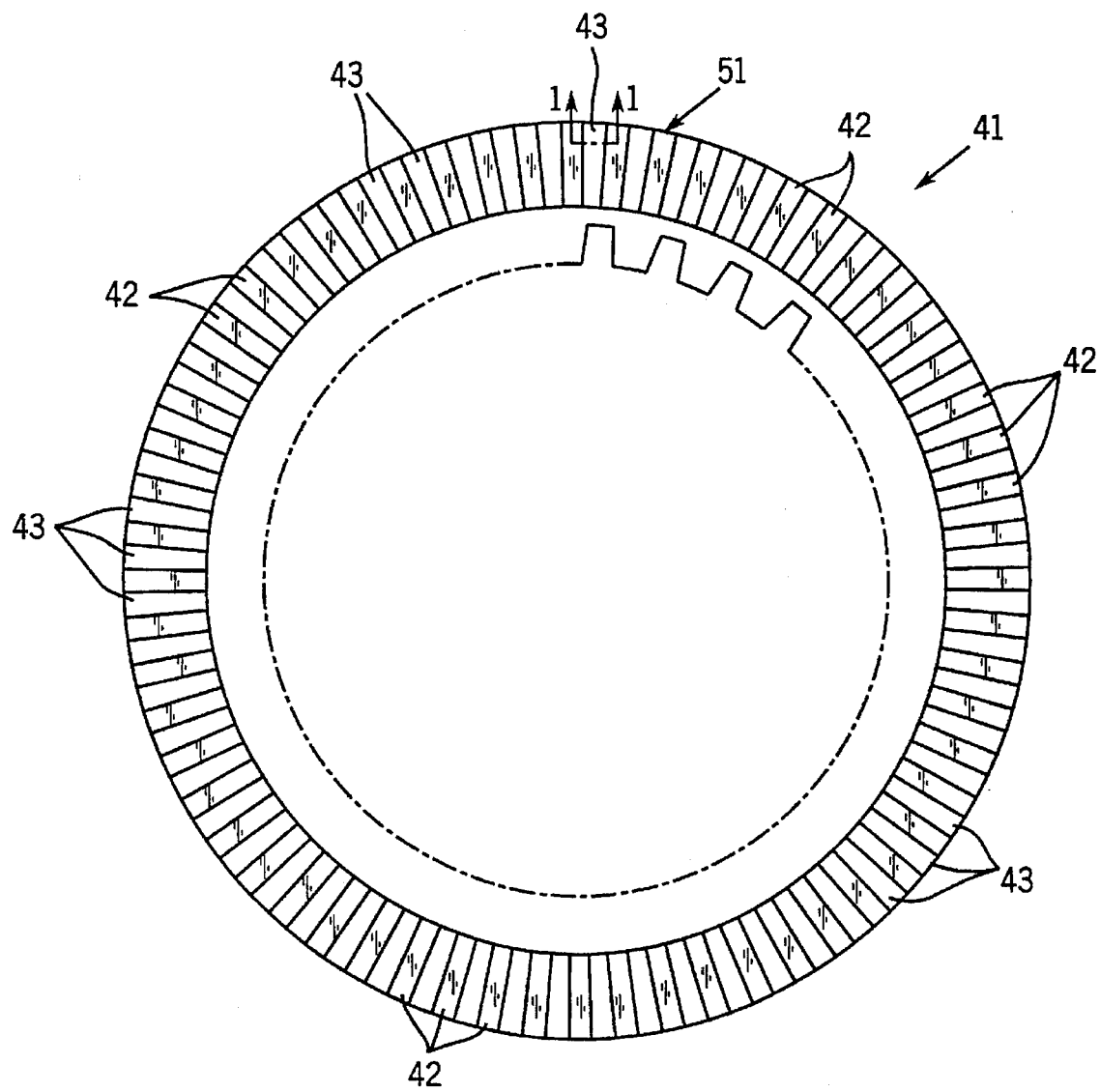
FIG. 7 is a side view of the wet-type friction plate.
Figure 8:
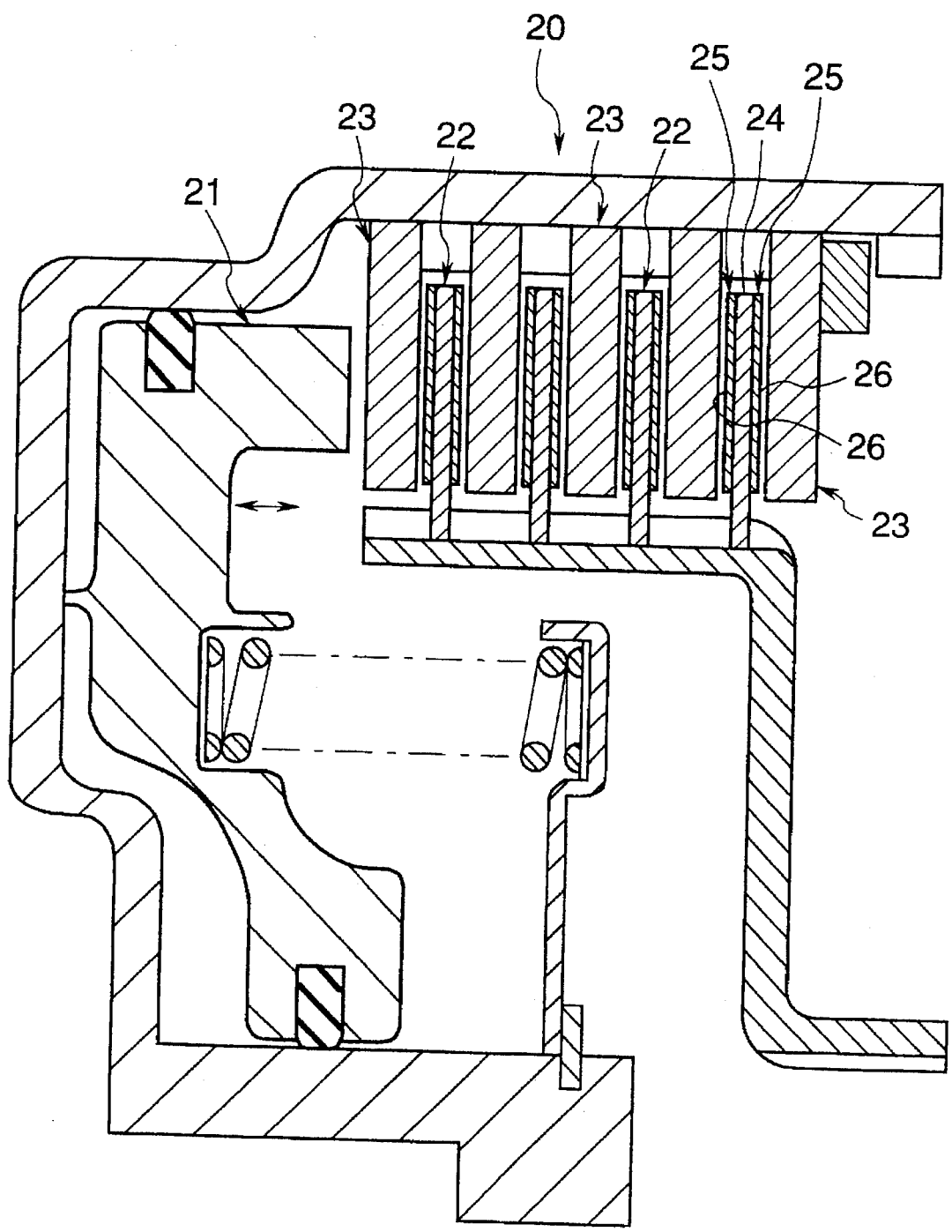
FIG. 8 is a cross-sectional view along the direction of the rotary axis of the wet-type friction engaging element.

In a friction member surface 42 of a friction member 51 of a multiple disk engagement device 20 shown in FIG. 7, grooves 43 for improving the coefficient of dynamic friction during initial engagement μi of the multiple disk friction engagement device are formed radially.

Figure 1A:
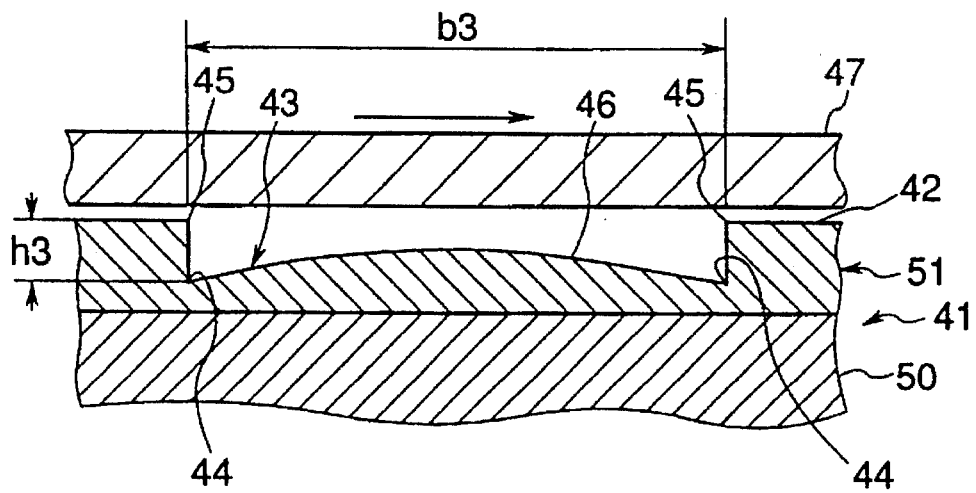
FIG. 1(a) is a cross-sectional view in the direction of width of a groove taken along line 1—1 of FIG. 7 of an embodiment of the present invention, showing a wet-type friction disk separated from a mating plate.
Figure 1B:
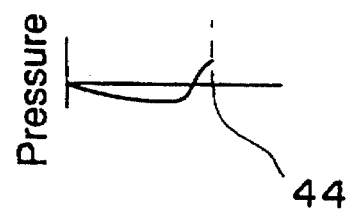
FIG. 1(b) a graph showing oil pressure versus distance in the grooves when the wet-type friction disk and the mating plate are engaged.

The friction member 51 in FIG. 1 is fixedly attached on a core plate 50. The grooves 43 are formed in a convex U-shaped cross-section in the direction of width. That is, both corner sections 44, 44 of the bottom of the grooves 43 are formed deeper than the intermediate section 46 in the direction of width.

Figure 9A:
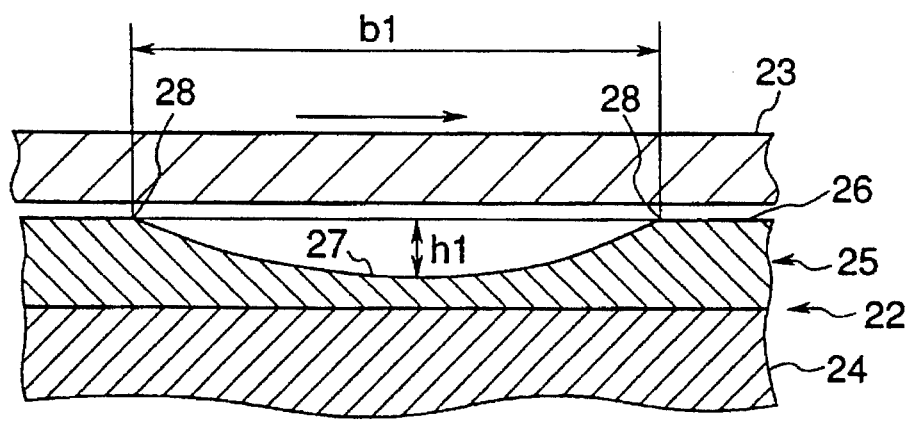
FIG. 9(a) is a cross-sectional view in the direction of width of a conventional groove, showing the wet-type friction plate separated from the mating plate
Figure 9B:
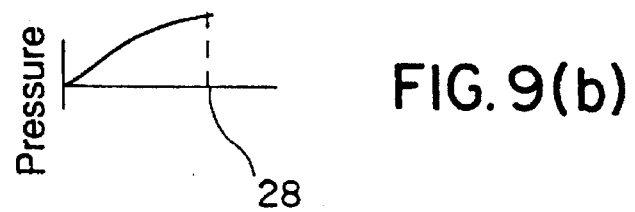
FIG. 9(b) is a graph showing the oil pressure build up in the grooves when the wet-type friction plate and the mating plate are engaged.

Since both corner sections 44 of the bottom of the grooves 43 are formed deeper than the intermediate section 46, the oil pressure at the corner sections (the upper corner sections of the grooves 43) 45, 45 at the boundary between the friction member surface 42 and the grooves 43 becomes lower than that at the corner 28 of the conventional grooves 27 shown in FIG. 9 when a mating plate 47 and a wet-type friction plate 41 are pressed into contact with each other. This is clear from a comparison between the graph in FIG. 1 part (b) and the graph in FIG. 9 part (b).

The grooves 43, therefore, are resistant to the flow of cooling oil in between the mating plate 47 and the wet-type friction plate 41, thereby breaking the oil film early to improve the coefficient of dynamic friction during initial engagement μi of the multiple disk friction engagement device.

Moreover, the cross-sectional area S3 in the direction of width of the groove 43 is equal to the cross-sectional area S1 in the direction of width of the conventional grooves 27 shown in FIG. 9. IF b3 is the width of the grooves 43, h3 is the depth of the corner 44 of the groove 43, and (h3/2) is the depth at center of the groove 43 in the direction of width, then S3=(2·b3·h3/3). As stated above, the cross-sectional area in the direction of width of the conventional grooves 27 is S1=(2·h1·h1/3). Since b3=b1 and h3=h1, S3=S1. Therefore, the cross-sectional area in the direction of width of the grooves 43 is equal to that of the grooves 27.

Figure 10:
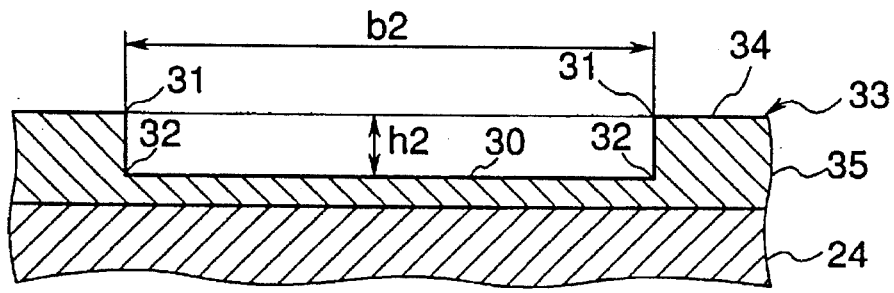
FIG. 10 is a cross-sectional view in the direction of width of another conventional groove.

A comparison made between the cross-sectional area S3 in the direction of width of the grooves 43 and the cross-sectional area S2 in the direction of width of the conventional grooves 30 in FIG. 10 indicates S2=b2·h2, b3=b2, and h3=h2, so that S3<S2. Therefore the cross-sectional area in the direction of width of the grooves 43 is smaller than that of the grooves 30.

Since the cross-sectional area in the direction of width of the grooves 43 is the same as, or smaller than, the cross-sectional area in the direction of width of the conventional grooves 27 and 30, the grooves 43 can be formed with approximately the same compressive force as, or a smaller compressive force than, the conventional compressive force in press working to form the grooves.

Figure 6:
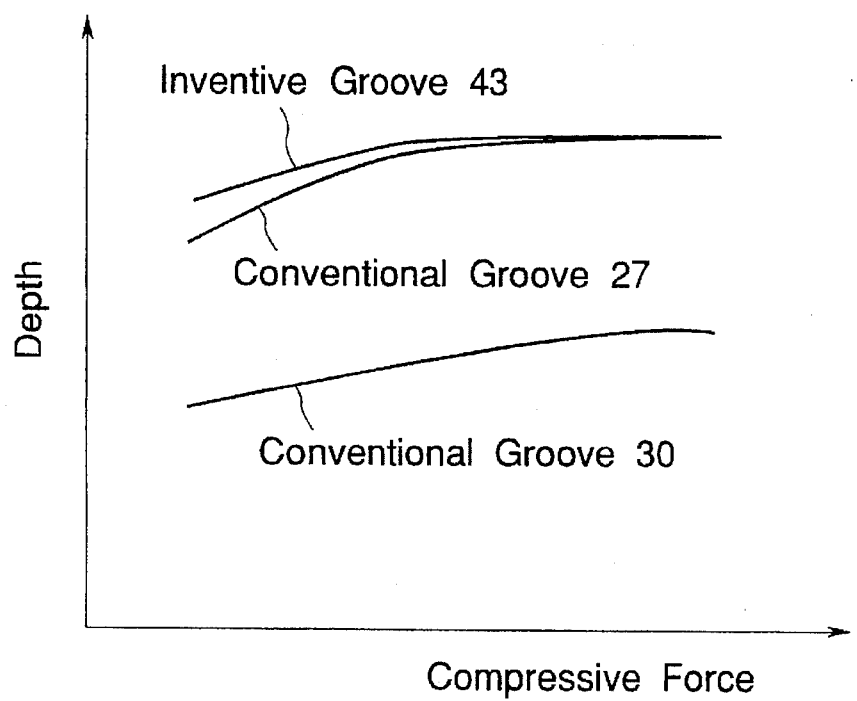
FIG. 6 is a graph of machining data showing a relationship between the depth of grooves and compressive force for machining in forming the grooves by a pressing machine.

As seen from the data of press working shown in FIG. 6, the grooves 43 are formed deeper than the grooves 27 and 30 with the same compressive force of the press. That is, it is understood that when grooves of the same depth are to be formed, the grooves 43 can be produced with approximately the same compressive force as, or a smaller compressive force than, the compressive force in forming the conventional grooves 27 and 30.

Figure 2:
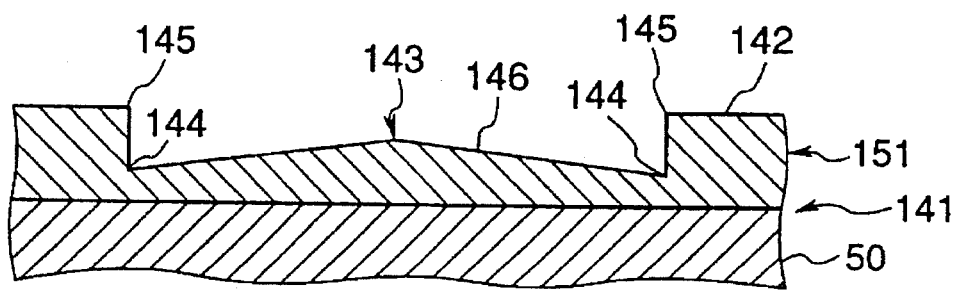
FIG. 2 is a cross-sectional view in the direction of width of a groove of another embodiment of the invention.
Figure 3:
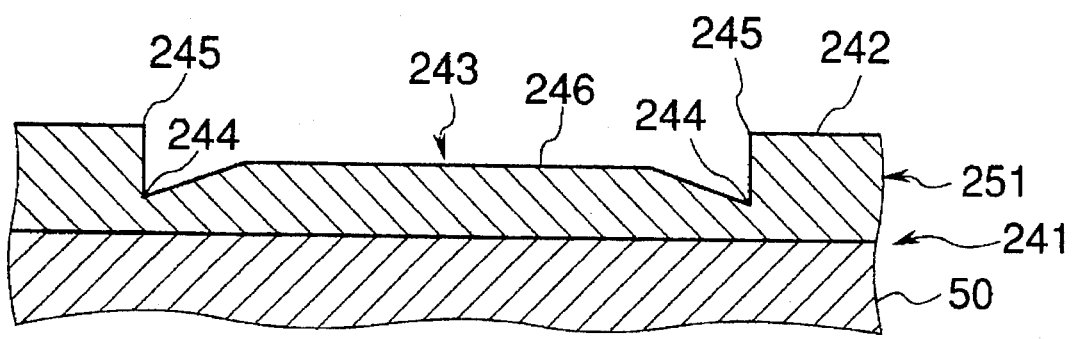
FIG. 3 is a cross-sectional view in the direction of width of a groove of another embodiment of the invention.
Figure 4:
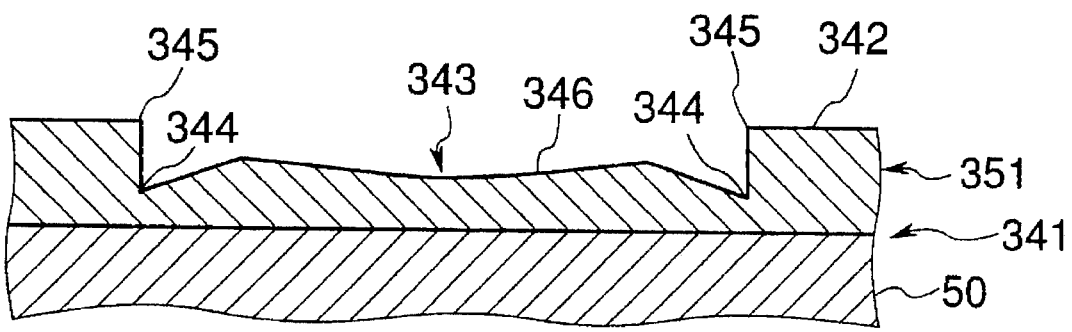
FIG. 4 is a cross-sectional view in the direction of width of groove of another embodiment of the invention.

Grooves 143, 243 and 343 shown in FIGS. 2, 3 and 4, respectively, are grooves of other embodiments of the invention. These grooves are also each formed in a convex U-shaped cross-section in the direction of width in the friction member surfaces 142, 242 and 342, respectively. The respective friction members 151, 251 and 351, are each fixedly attached on the corresponding core plate 50, as in the first embodiment. The bottom of the grooves 143 of FIG. 2 is formed convex; the bottom of the grooves 243 of FIG. 3 is formed trapezoidal; and the bottom of the grooves 343 of FIG. 4 is formed double-crested.

Both corner Sections 144, 244 and 344 of the bottoms of the respective grooves 143, 243 and 343 are formed deeper than the respective intermediate sections 146, 246 and 346 in the direction of width. In addition, in the case of these grooves 143, 243 and 343, the cross-sectional area in the direction of width is approximately the same as, or smaller than, the cross-sectional area in the direction of width of the conventional grooves 27 and 30.

Furthermore, the oil pressure at the corner sections 145, 245 and 345 (upper corner sections of the grooves 143, 243 and 343) at the boundary between the friction member surfaces 142, 242 and 342 and the grooves 143, 243 and 343 is lower than the oil pressure at the corner 28 of the conventional grooves 27. Therefore, the grooves 143, 243 and 343 are resistant to forcing of the cooling oil in between the mating plate 47 and the wet-type friction plates 141, 241, and 341, thereby breaking the oil film early to improve the coefficient of dynamic friction during initial engagement μi of the multiple disk friction engagement device.

Figure 5:
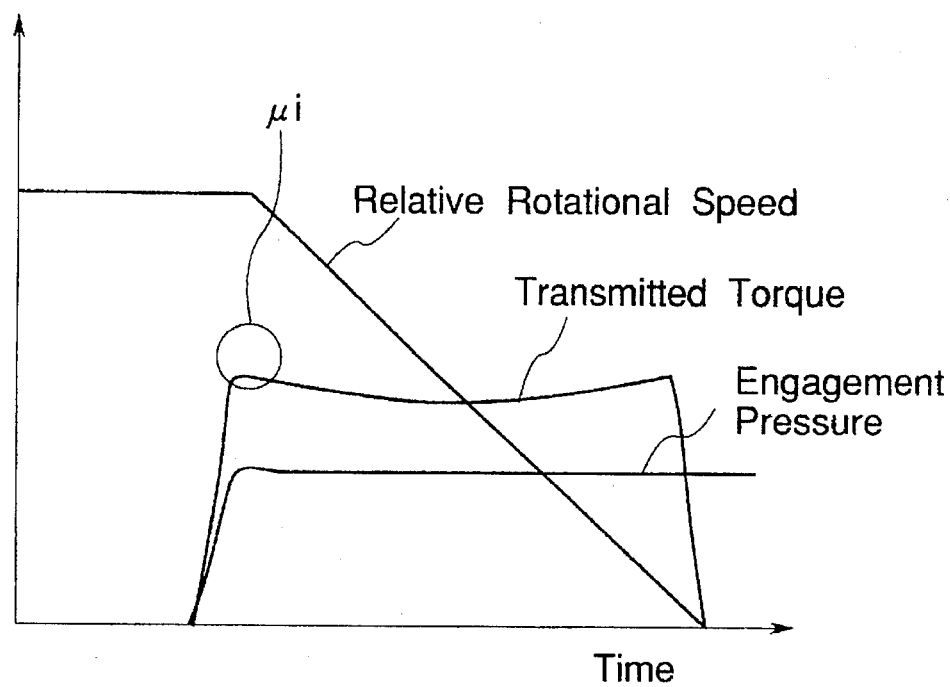
FIG. 5 is a graph showing transmission torque, engaging pressure, and relative rotational speed versus time during the initial engagement of the wet-type friction engaging element having grooves of the present invention.

FIG. 5 is a graph obtained by tests which shows values of transmission torque, engaging pressure, and relative rotational speed during the initial engagement of the multiple disk friction engagement device. From FIG. 5, it should be appreciated that an initial transmission torque can be increased within a short period of time by improving the coefficient of dynamic friction during initial engagement μi.

In the groove structure of the invention, since each groove is formed deeper at both corner sections of its bottom than at the intermediate section, it is possible to improve the coefficient of dynamic friction during initial engagement of the wet-type friction engaging element, by making the oil pressure at the corner section (upper corner section of the groove) at the boundary between the friction member surface and the grooves lower than at the corner section of the conventional groove, and accordingly breaking the oil film early. Furthermore, since the cross-sectional area in the direction of width of the grooves is less than the conventional cross-sectional area in the direction of width, it is possible to restrict the machining cost of the wet-type friction engaging element without increasing the compressive force in press-working when forming the grooves than that in the conventional grooves. In addition, decreasing the cross-sectional area in the direction of width of the grooves than that of the conventional grooves can provide the wet-type friction engaging element with a greater strength.

We claim:

1. A groove structure of a wet-type friction engaging element wherein grooves of an approximately U-sectional shape are formed in the surface of a frictional material of a wet-type friction engaging element, and both corners of a bottom surface in the direction of width are formed deeper than an intermediate section in the direction of width.

* * * * *